April 3, 1928.
A. V. CASSAL
1,664,590
CIRCUIT CAMERA
Filed July 24, 1923
7 Sheets-Sheet 1
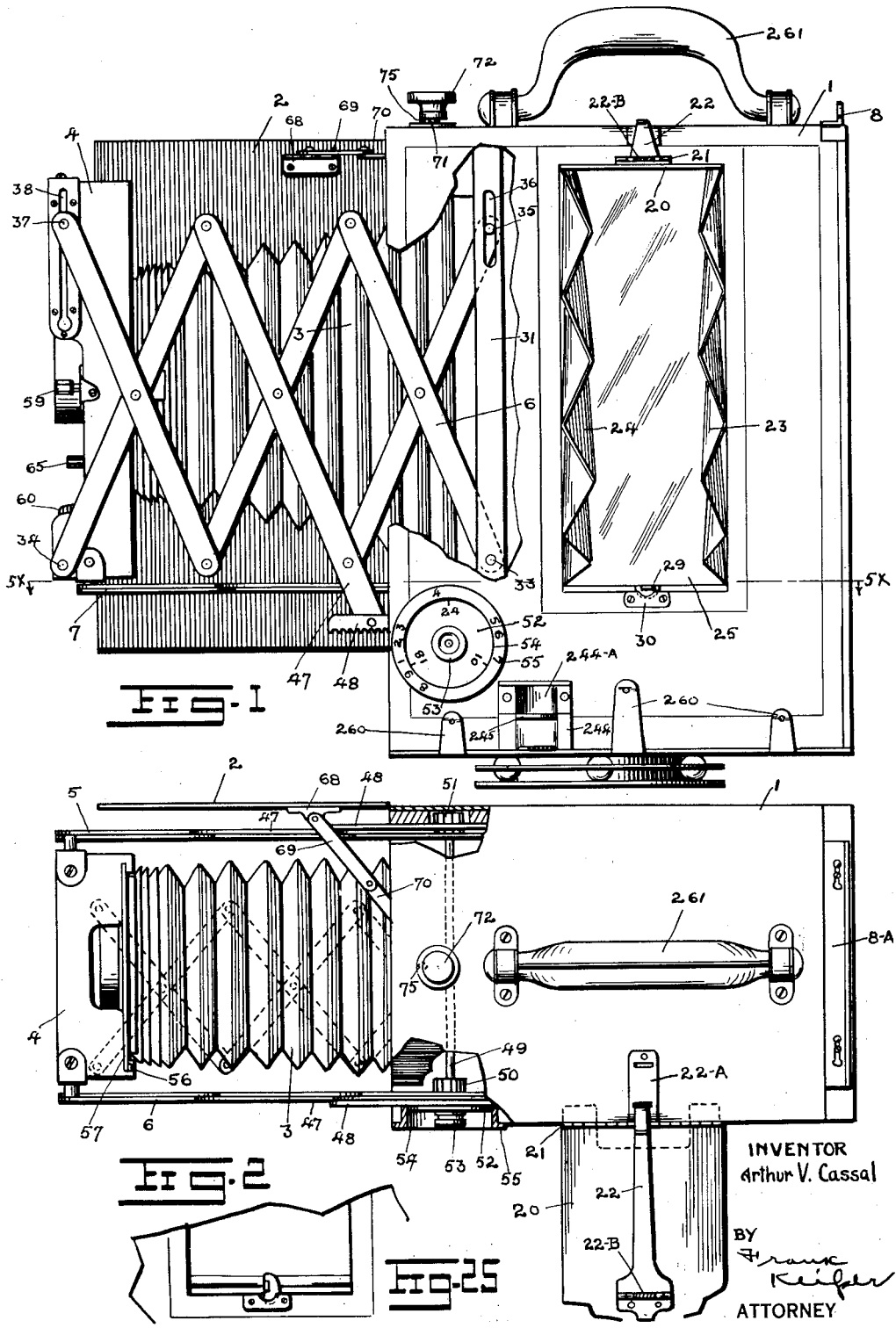
INVENTOR
Arthur V. Cassal
BY Frank Keifer
ATTORNEY April 3, 1928. 1,664,590
A. V. CASSAL
CIRCUIT CAMERA
Filed July 24, 1923 7 Sheets-Sheet 2
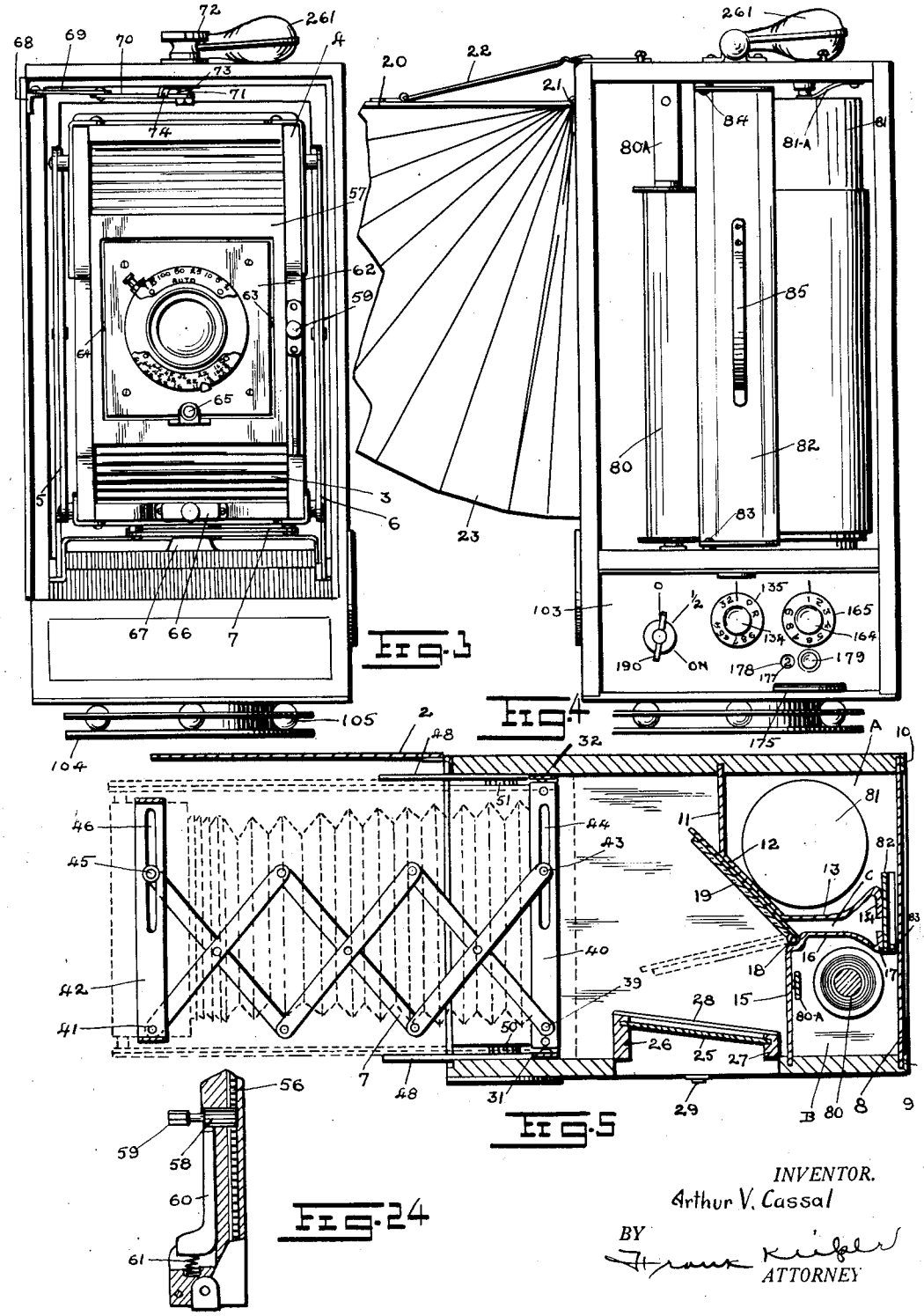
INVENTOR.
Arthur V. Cassal
BY
ATTORNEY

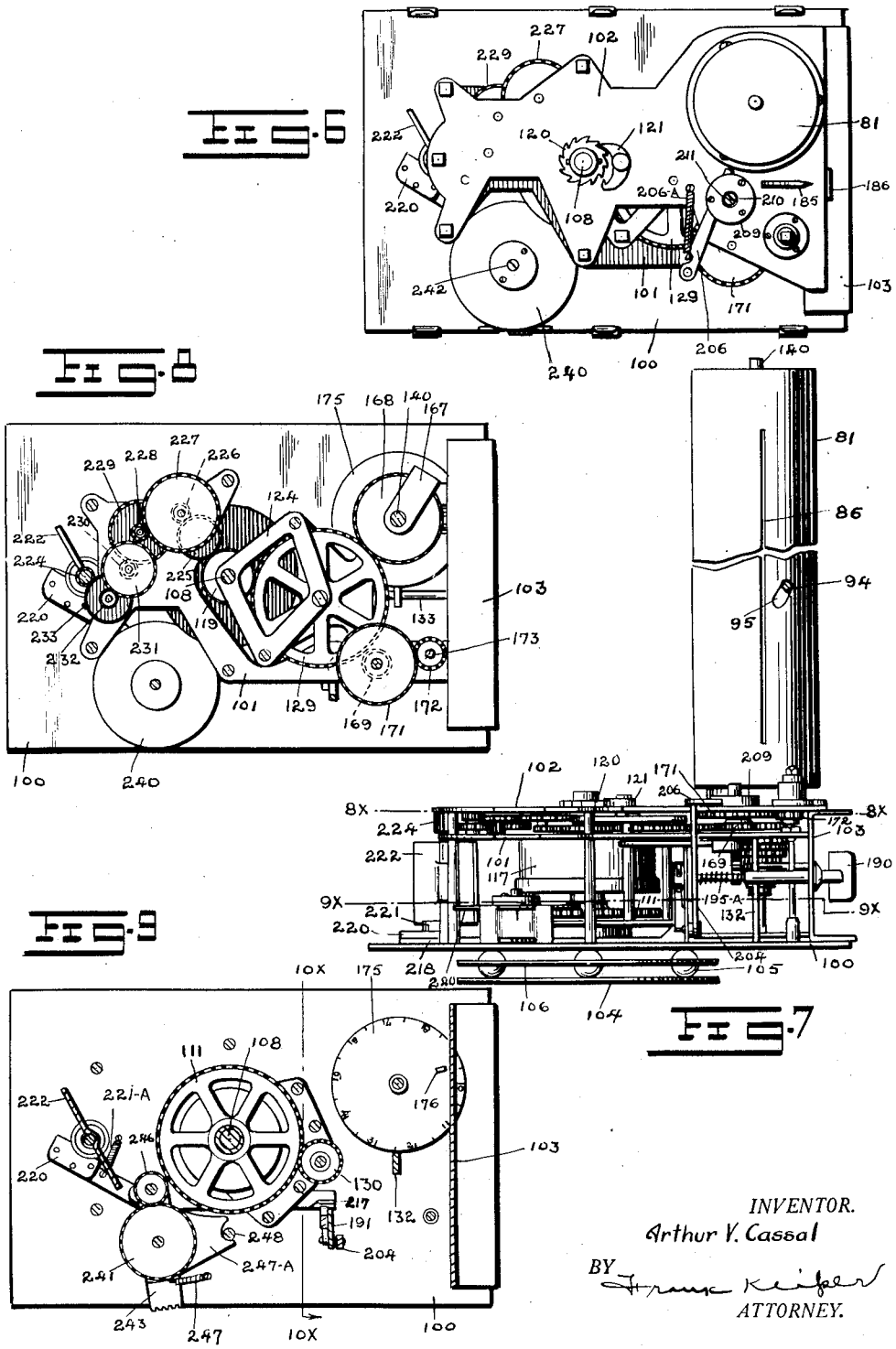

April 3, 1928.
A. V. CASSAL
1,664,590
CIRCUIT CAMERA
Filed July 24, 1923
7 Sheets-Sheet 4
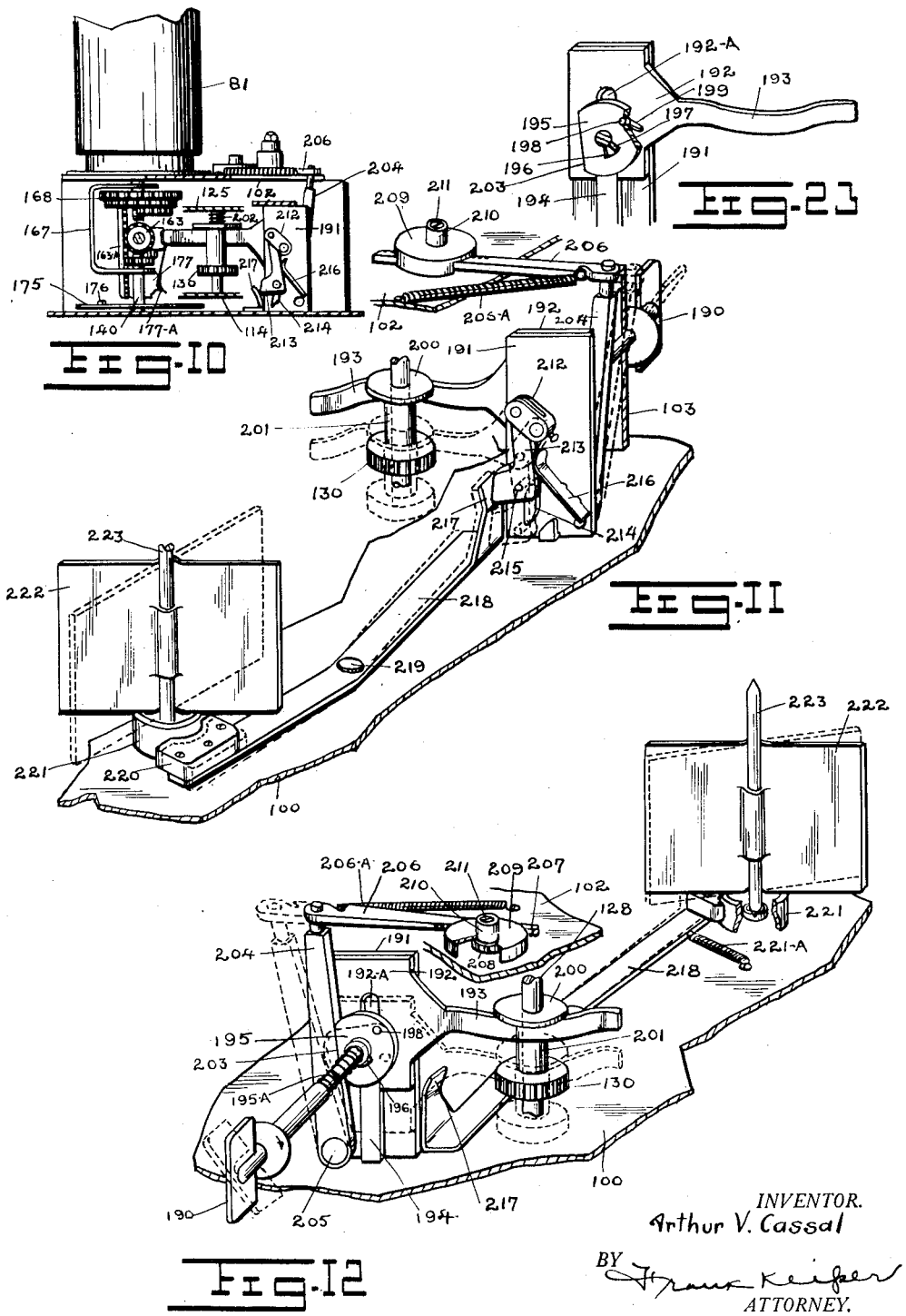
INVENTOR.
Arthur V. Cassal
BY
ATTORNEY.

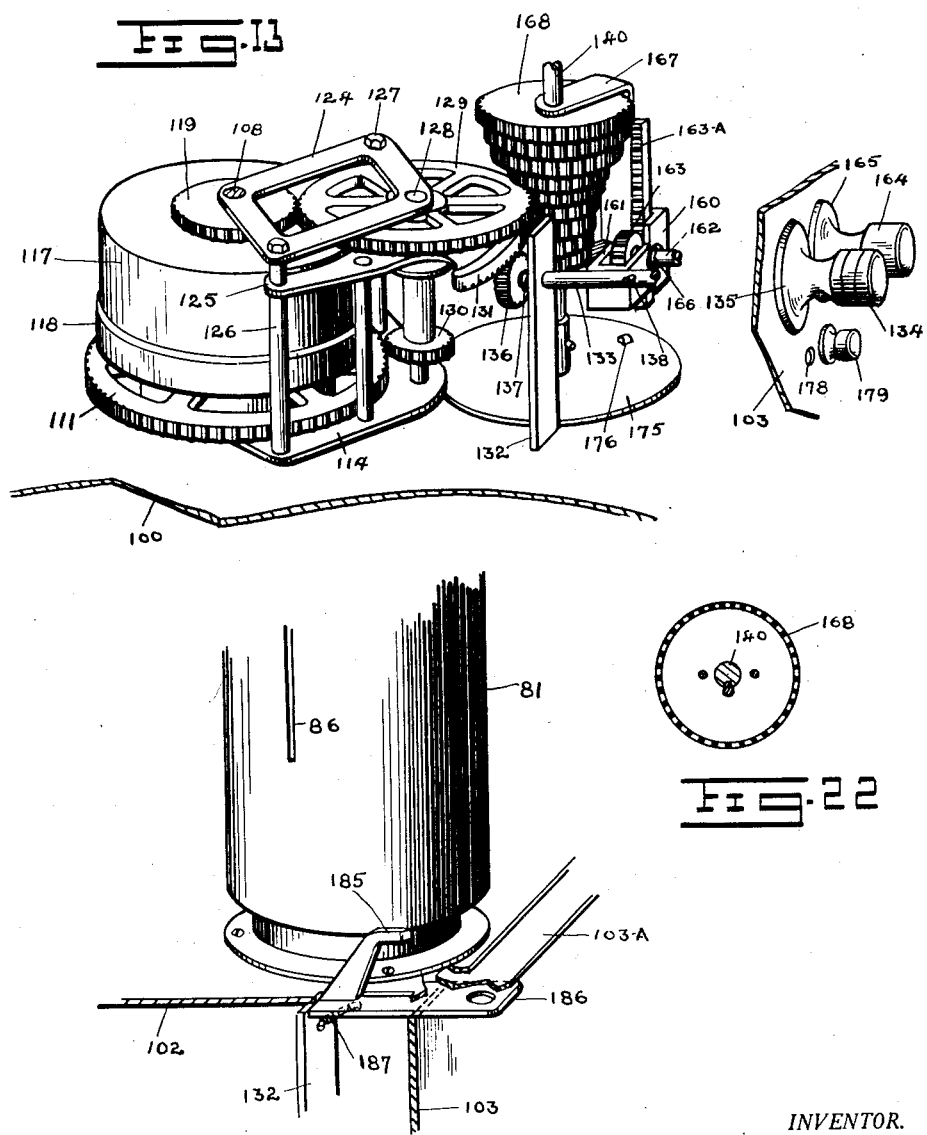

April 3, 1928.

A. V. CASSAL 1,664,590

CIRCUIT CAMERA

Filed July 24, 1923

INVENTOR.
Arthur V. Cassal

BY
ATTORNEY.

April 3, 1928.

A. V. CASSAL 1,664,590

CIRCUIT CAMERA

Filed July 24, 1923

INVENTOR
Arthur V. Cassal
BY
Frank Keifer
ATTORNEY

Patented Apr. 3, 1928.

1,664,590

UNITED STATES PATENT OFFICE.

ARTHUR V. CASSAL, OF ROCHESTER, NEW YORK.

CIRCUIT CAMERA.

Application filed July 24, 1923. Serial No. 653,459.

My invention relates to the so-called panorama cameras or circuit cameras in which a long film is exposed by swinging the camera around the arc of a circle so as to bring successive portions of the film into focus with the field on which the camera is exposed as the camera swings from one side to the other on a fixed pivot as it is driven by a spring motor.

Another object of the invention is to decrease the weight of the camera without impairing its strength or efficiency.

Another object is to provide separate compartments for the supply roll and the receiving roll for the film, the compartments being spaced apart with a slot between them through which the light passes to the film.

Another object is to drive the film at different speeds according to the length of focus of the lens used and make the gearing easily and quickly changeable to produce the different speeds.

These and other objects of my invention will be illustrated in the drawings described in the specification and pointed out in the claims at the end thereof.

In the drawings Fig. 1 is a side elevation of my camera with the bellows extended.

Fig. 2 is a top plan view of the camera as shown in Fig. 1.

Fig. 3 is a front elevation of the camera with the bellows extended.

Fig. 4 is a rear elevation of the camera with the focusing hood extended on one side.

Fig. 5 is a horizontal section through the camera on the line 5×—5× of Fig. 1, the bellows and lazy tongs being shown in dotted lines to bring out the relations of the parts.

Fig. 6 is a top plan view of the drive mechanism of the camera and film.

Fig. 7 is a side elevation of the drive mechanism of the camera with the film drum shown extended thereabove.

Fig. 8 is a horizontal section on the line 8×—8× of Fig. 7.

Fig. 9 is a horizontal section on the line 9×—9× of Fig. 7.

Fig. 10 is a vertical section on the line 10×—10× of Fig. 9.

Fig. 11 is a perspective view of the key and the control mechanism directly related to it, looking at it from the left in Fig. 7.

Fig. 12 is a perspective view of the key and the control mechanism directly related to it looking at it from the right in Fig. 7.

Fig. 13 is a perspective view of the speed regulating device for controlling the relative movement of the film and the camera and changing the relative speed thereof.

Fig. 14 is a perspective view of the device for punching or marking the film at the end of the exposure.

Fig. 22 is a horizontal section through the cone of gears below the top gear.

Fig. 23 is a perspective view of the cam disc and arm for shifting the gear to secure the driving of the film and the rotating of the camera.

Fig. 24 is a detail view of the latch and gear for controlling the elevation of the lens.

Fig. 25 is a detailed view of the button in position to lock both the door and pocket to the case.

In the drawings like reference numerals indicate like parts.

Figure 15:
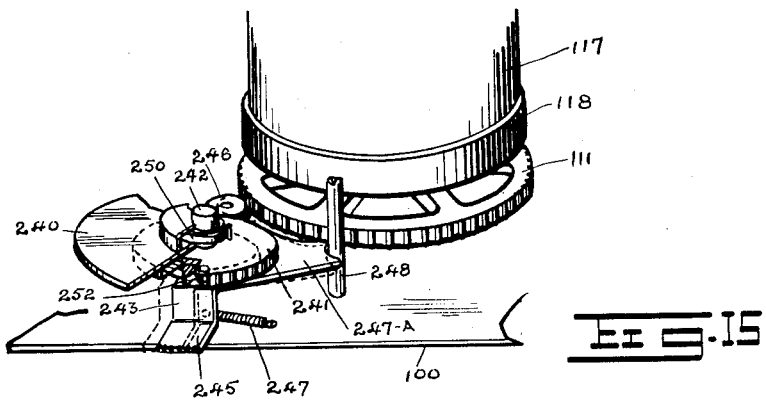
Fig. 15 is a perspective view of the drum that carries the spring of the motor and the gearing which connects it with the dial, the dial being shown partly broken away to expose the gearing.

In the drawings reference numeral 1 indicates the body of the camera having a swinging door 2 at the front and a bellows 3, a lens front 4 which lens front is supported and guided by the lazy tongs, 5, 6 and 7. At the back of the camera is the slide 8 moving in guides 9 and 10 by which the back of the camera is closed. On top of the slide 8 is a locking plate 8ᴬ that engages with the camera case to lock the slide. The inside of the camera is divided by the partition 11 which extends first transversely and then diagonally as indicated at 12 and then rearwardly as indicated at 13 ending in a flange 14 that is parallel with the rear of the camera. This partition is in the right hand corner of the camera looking at the camera from the rear and is intended to contain the drum on which is wound the film immediately ofter exposure. This drum will presently be described. In the left hand corner of the camera looking at it from the rear is a partition 15 which extends first transversely and then rearwardly as indicated at 16, ending with a flange 17, that is parallel to the rear of the camera. Between the sides 15 and 16 of the partition is formed a recess in which is mounted the pivot 18 of a swinging mirror 19.

On the left hand side of the camera as viewed from the rear is a swinging door 20 pivoted at 21 and normally nested in the sides of the camera flush therewith. On this door is a link 22 by which it can be held in the position shown in Fig. 4, namely extending out horizontally at right angles to the side of the camera. On the sides of this door are fastened the curtains 23 and 24 by which a hood is formed to shade the ground glass plate 25 during focusing. This ground glass is mounted in the pocket formed by the sides 26 and 27 and held together at the bottom by the plate 28 and held together by a similar plate at the top. The door 20 is locked to the pocket by the turn button 29 which is carried on the bottom of the pocket and can be turned down into engagement with the socket 30 to disengage it from the door 20 and lock the pocket to the side of the camera. This permits the door to swing up independent of the pocket. The button 29 can be turned up locking the pocket and the door together permitting both of them to swing up as a unit on the pivot 21, or it can be put in an intermediate position so as to engage both the pocket and the door in which position it will lock the pocket and the door in the side of the camera.

The link 22 engages with the plate 22ᴬ on top of the camera which plate has two slots therein one of which slots holds the link so as to support the door 20 and the curtains 23 and 24 in the position shown in Figs. 1 and 4. The second slot is engaged by the links when the door and pocket and ground glass plate are raised as a whole to a higher position when it is desired to get at the lens from within the camera. A spring 22ᴮ is provided in the hinge by which the link 22 is normally held in engagement with the plate.

When the ground glass is in the position shown in Fig. 5 it catches the reflection from the mirror 19 so that the photographer can see the image of the picture on the ground glass and focus his camera accordingly. When the pocket is turned up to its raised position, the lens of the camera is accessible from the inside of the camera. When the camera is idle the mirror is normally in the position shown in Fig. 5, resting against the diagonal partition 12 and closing the slot that is left between the walls 13 and 16. When the camera is thrown into operation for the purpose of making an exposure the mirror is swung to the dotted line position by mechanism that will presently be described. This exposes the slot at the rear of the camera through which the light from the lens reaches the film at the back of the camera as it travels across the opening at the back of the camera. The door and pocket swing on the camera frame with the same hinge and pivot. For this purpose the leaf on one side of the hinge is divided into three parts, the two end parts being fastened to the top end of the pocket frame and the intermediate part being fastened to the back of the door.

As shown in Figs. 1 and 5, I provide a brace 31 inside of the camera box and outside of the bellows and a similar brace 32 is provided on the opposite side of the camera. The bottom of the lazy tongs is pivoted to these braces as indicated at 33 at the rear end and the front end is pivoted to the lens front as illustrated at 34. The top of the lazy tongs at the rear end is provided with a pin 35 that slides in a slot 36 and at the front end is provided with a pin 37 that slides in a slot 38. This construction is used on both sides of the lens front. On the bottom of the camera the lazy tongs 7 is pivoted at 39 to a brace 40 mounted on the camera case outside of and below the bellows and at the front is pivoted at 41 to a brace 42. At the rear the lazy tongs is provided with a pin 43 that slides in a slot 44 in the brace 40 and at the front it is provided with a pin 45 that slides in a slot 46, provided in the brace 42 which is mounted on the bottom of the lens front. The lazy tongs 5 and 6 support the lens front as it moves out and keeps it from dropping down and the lazy tongs 7 under the bellows keeps the bellows from swaying sideways. This arrangement of the lazy tongs gives a long extension to the bellows and holds it steady and provides a support that folds up very compactly into the camera when the camera is closed up.

One link 47 of each of the lazy tongs 5 and 6 is made extra long and at the bottom it is connected to a rack 48 by which rack the lazy tongs, lens front and bellows are extended or retracted by a mechanism that will now be described.

Mounted in the base of the camera is a shaft 49 on which are carried the pinions 50 and 51. These pinions are elongated and the shaft has a slight endwise movement. On the shaft is carried a dial 52 and a handle 53, by which the shaft can be turned. The disc rotates in a socket 54 having a flange 55 thereon which is marked with suitable indexing marks, the dial being also marked with suitable indexing marks. The pinions 50 and 51 engage with the racks 48, 48 on each side of the camera frame and by turning the handle 53 the racks are moved in or out and the movement of the rack is communicated to the lens front and bellows through the links 47. The arrangement is such, that the lens front moves more than 3 times as fast as the rack which drives it so that the lens front can be quickly moved forward to any desired position and by watching the marks on the dial 52 and flange 55 as shown in Fig. 1 the lens front can be stopped at any desired position. To make the handle 53 more accessible it can be pulled out from the position shown in Fig. 2 and for this purpose the pinions 50 and 51 are made elongated so as to maintain their engagement with the racks. As shown in Fig. 2 the handle 53 can be pushed in to the socket in which position the end of it will be flush with the side of the case and will therefore be out of the road.

For the purpose of adjusting the lens front up and down I provide a rack 56 mounted on the back of the plate 57, which rack is engaged by an elongated pinion 58 turned by the button 59. A latch 60 is provided, which latch has an up and down movement being normally held up by the spring 61. The upper end of the latch engages between the teeth of the elongated pinion 58 at the forward end and holds it against rotating so that the pinion will hold the lens front at any elevation to which it may have been raised or lowered by the turning of the button 59. The button 59 is turned by one hand while the latch 60 is depressed with the other hand and as soon as the latch is released it raises at once and engages the pinion 58 holding it against turning.

The lens is supported in the plate 62 which is pivotally mounted at 63 and 64. This plate is engaged at the bottom by a screw 65 which is turned to make the plate swing out or in at the bottom. In this way the lens is tilted to bring it in correct relation with the film. The screw 65 is swiveled in a small bracket mounted on the plate 57.

On the bottom of the lens front is provided a button 66 which can be turned into engagement with a socket 67 by which the lens front will be locked in its innermost position in the camera. Connected to the top of the front door is a bracket 68 to which is pivoted a swinging link 69. This link in turn is connected with a crank 70 which is fastened on the bottom of the shaft 71. This shaft extends up through the top of the camera and is fastened to a button 72 on top of the camera. A spring 73 is provided by which the shaft and button are normally held in their lowest position. A stop 74 is provided which limits the outward swing of the crank 70 and holds the door 2 in the position shown in Fig. 2. The button 72 is provided on its underside with a pin 75. The plate on which the button turns is provided with two holes either one of which is engaged by this pin, when the button and shaft are drawn down by the spring 73. In one position it locks the door 2 open and in the other position it locks the door 2 closed. In this way the front of the camera is made comparatively light so that even though the bellows is extended to the full length for taking a picture with a long focus lens, the camera will be in balance when resting level on the turn table without any other fastenings. The turn table is placed a little forward of the center of the base of the camera box and will be described later. The bellows etc. will be sufficiently counterbalanced by the weight of the parts in the back of the camera that will be described later on. On this account fastening to a tripod is not necessary and the camera can be set on any convenient rest for the purpose of taking the desired picture.

In the back of the camera as above explained is provided two compartments A and B. Both of these compartments are closed to the light from the back when the slide 8 is in its correct position. Between these compartments is the slot C through which the light passes from the lens to affect the film and impose a latent image thereon. The fresh film is mounted on a spool 80 which is supplied to the trade with a slotted end so that it will engage with a key such as is used in the kodak cameras by which it can be turned forward. In my camera the fresh spool of photographic film is suitably mounted to turn in the compartment B and passes immediately back of the upright flanges 17 and 14 and is engaged with the drum 81 that is permanently mounted to turn in the compartment A which drum is driven automatically by a spring motor. The film is held forward against the flanges 17 and 14 by the film retard plate 82 which is mounted to swing at 83 and 84. The film retard consists of a plate that has a box spring 85 mounted on the back thereof which is engaged by the slide 8 and by which it is firmly pressed forward against the flanges 14 and 17. The flanges 14 and 17 and the retard plate 82 are all covered with velvet on the surfaces exposed to the film. The depth of the velvet holds yielding pressure on the film which prevents the light from leaking through into the compartments A and B and also keeps the film from being scratched. It also puts a load or tension on the film so that it will move uniformly and will not jump, it being understood that the supply roll 80 can turn easily as the film is drawn from it by the drum 81.

In compartment B is provided a spool bracket comprising a stationary plate 80^A having perforations therein at suitable intervals. This stationary plate or guide is supported on the wall 15 and is spaced therefrom by washers placed thereunder at suitable intervals. A channel shaped slide 80^B is mounted to slide on the plate 80^A. The channel shaped slide 80^B has a spring 80^C on the lower end thereof with a pin therein adapted to engage the holes in the stationary plate by which the slide can be supported and fastened at different elevations so as to take in spools of different lengths. A handle 80^D is provided on the bottom of the spring by which it may be sent out to disengage the pin thereon from the stationary plate permitting it to be moved to a new position. At the upper end of the slide 80^B is a second slide which is also channel shaped and is provided with a rearwardly extending arm which has a pin on the underside thereof to form a bearing for the upper end of the spool that carries the film. The upper part of the slide is connected to the lower part of the slide by a tension spring so that the two move together as one for the purpose of changing the elevation to accommodate different lengths of spools. After the lower slide is fastened in place on the stationary plate the upper slide may be raised a short distance from it to permit the insertion of a spool after which the tension spring draws it down so that the pin in the overhanging arm engages the bearing in the upper end of the spool.

The drum 81 is provided with a slot 86 which is adapted to receive the forward end of the paper that is attached to the film. This paper is locked to the drum by the device that will now be described. Inside of the drum are placed concentric brackets 87 and 88. These brackets support stationary pins 89 and 90. A sliding locking plate 91 is held in place by the brackets 87 and 88. This plate has diagonal slots therein 92 and 93 which engage with the stationary pins 89 and 90. The plate 91 is provided with a handle 94 which projects through a slot 95 in the drum which slot is parallel with the slots 92 and 93. The plate can be moved up and down from the outside of the drum by means of a handle 94 and in so moving, it moves sideways across the slot 86, and engages the paper inserted therein and clamps it against the inside of the cylinder or against the edge of the slot.

The drum 81 is rotated at variable speeds by a spring motor and variable speed gearing which I am now about to describe. This same spring motor also drives the gearing which causes the camera to swing through the desired arc simultaneously with the turning of the drum to feed the film for exposure, the two movements co-operating to take the desired picture.

The motor and gearing is carried on a frame which is made up of horizontal plates 100, 101 and 102. These plates are suitably spaced apart by sleeves and held together by bolts fastened therethrough. At the right hand end of the frame as shown in Fig. 7 is provided a flanged plate 103 by which the top and bottom plates are spaced apart and held together.

Below the bottom plate 100 is provided an angular flanged plate 104 which rests on the top of the tripod and remains stationary thereon. On this flange plate is provided an angular plate 106 having a series of openings therein in which are carried balls 105. The inner edge of the plate is struck up and down with a series of lugs. The even numbered lugs extend down and the odd numbered lugs extend up. These lugs span the opening between the flange on plate 104 and the plate 100. The even numbered lugs are a little longer than the odd numbered lugs, and therefore hold the plate 106 slightly above the central point. The plate 106 is provided with a number of openings in each of which is carried a steel ball, preferably about 5/8" in diameter, which balls rest on the flange of the plate 104 and support the plate 100 so that it can turn thereon. The bottom plate 100, the flange plate 104 and the balls form a turn table on which the camera is carried around.

A sleeve 107 is provided which has a flange on its lower end. This flange is riveted to the plate 104. A shaft 108 passes up through this sleeve and turns therein. This shaft has a key or handle 109 on the lower end thereof. The handle is threaded centrally to receive a screw by which the camera can be fastened to a tripod. The upper end of the sleeve 107 is pinned to a gear wheel 111. The sleeve 107 passes through the plate 100 and the plate turns thereon. On the plate 100 is fastened a flanged collar 112 which surrounds the sleeve 107 and forms a bearing therefor. Surrounding the flange collar 112 is a flanged collar 113 which collar supports the plate 114 so that it can turn independent of the rest of the mechanism. A disc spring 115 is interposed between the gear 111 and the plate 114, by which all the loose parts are held in the correct relation to the plate 100. On the shaft 108 above the gear 111 is provided the spacing collar 116 which collar is loose on the shaft 108. Concentric with the shaft is the drum 117 which carries the spring of the motor, which spring is a spiral spring one end of which is fastened to the drum and the other end to the shaft. The drum is made of two parts, the top part being a housing which sets down on the flanged plate 118, the two parts being fastened together by screws. On top of the housing of the drum is fastened the gear wheel 119. The shaft 108 extends up through the plate 102 and on top of the plate a ratchet wheel 120 is fastened to the shaft. A pawl 121 is pivotally mounted on the plate 102 and engages with the ratchet wheel 120 to prevent it from turning backward.

The gear 119 is driven by the spring motor as it unwinds and this gear in turn drives the mechanism which causes the camera to swing and causes the cylinder in turn to draw the film forward and this mechanism will now be described.

Mounted to swing concentric on the shaft 108 is a frame composed of the plates 114 and 124. The plate 124 is mounted to swing directly on the shaft 108 and the plate 114 is supported on the flanged collar 113 that swings around the flanged collar 112 which is fastened to the plate 100. Plate 125 is mounted to move with the plates 114 and 124. The plates 125 and 114 are suitably spaced apart by shouldered studs, 126 and 127. The sleeves are placed on top of the plate 125 which sleeves support the plate 124. The studs 126 and 127 are threaded into the plate 114 and the upper ends of the studs are threaded to receive nuts by which the three plates and the studs are all clamped together. The plates 114, 124 and 125 and the studs which connect them form a swinging frame on which frame is carried a shaft 128, to which shaft is keyed the large gear wheel 129 and the small gear wheel 130 is splined thereon.

The large gear wheel 129 is always held in mesh with the gear 119 and the axis of the gear 129 and 130 can swing back and forth around the centre of the gear 119 for the purpose of carrying these gears into mesh with other gears of the train of gearing or disengaging them therefrom. In this way the power of the gear 119 can be applied selectively to other gears as will presently be explained.

On the plate 125 is carried a circular rack 131 that is concentric with the gear 119. The teeth of this rack extend downwardly and are radial to the centre of the gear 119. Through this rack 131 the frame comprising the plates 114, 124 and 125, is swung around the center 108 and is locked in any desired position.

Mounted between the plates 100 and 102 is the upright support 132 in which is provided an opening which serves as a bearing for the shaft 133. This shaft extends outwardly through the flange plate 103 and on its outer end is provided with a knob 134 having a dial 135 on the base thereof which normally bears against the plate 103. This dial is marked with suitable numbers as is shown in Figure 4 and on the under side of the dial is a series of holes one under each of these marks. A pin is fastened in the plate at the top of the dial with which these holes engage in succession so to hold the dial correctly in any one of a number of positions as indicated by the numbers on the dial. On the opposite end of the shaft 133 is a pinion 136 which engages with the rack 131. A spring 137 is interposed between the pinion and the upright 132 to move the shaft to the left in Fig. 13 and normally hold the dial 135 in engagement with the pin on the plate 103 so as to prevent accidental displacement of the shaft 133, pinion 136 and rack 131. This in turn holds the frame comprising the plates 114 and 124 in any one of a number of desired positions and holds the gears 129 and 130 in a corresponding position.

A pin 138 is provided on the shaft 133 which engages the plate 103 when the spring 137 is compressed and the knob 134 is drawn out to limit the endwise movement of the shaft 133 and keep the gear 136 in mesh with the rack 131. In Fig. 13 the shafts 133 and 162 are shown broken and the plate 103 and knobs and dials are moved to the right to show parts that would otherwise be concealed by the plate.

Parallel to the shaft 108 is provided a shaft 140 which shaft is supported between the plates 100 and 102. On this shaft is provided a cone of gears preferably nine in number of different diameters to secure the various angular velocity ratios by which the drum 81 is driven for the purpose of drawing the photographic film during the exposure. Each of these gears is provided with two pin holes therein so that the gears may be assembled one on top of the other and all the gears will be fastened together by pins which pass through these pin holes from the top of the series to the bottom. The gears are also provided with a shaft opening central therewith and a keyway by which they are engaged by a key or a spline that is provided on the shaft. This series of gears can be moved up and down on the shaft 140 as a unit for the purpose of bringing any one of the gears to the same level with the gear 129 so that in this way each one of these gears can be selectively positioned to mesh with the gear 129 when its axis is swung around by means of the circular rack 131 and the parts associated therewith as above described.

The mechanism by which the cone of gears can be raised and lowered will now be described.

Mounted on the plate 103 is a bracket 160 having an overhanging arm 161. Through the plate and the bracket and arm extends a shaft 162 which shaft is mounted to rotate therein in bearings in the overhanging arm 161 and the plate 103. On this shaft is carried a pinion 163 which engages with the rack 163ᴀ so that by turning the shaft and pinion the rack is raised and lowered. On the outer end of the shaft is provided the knob 164 which is provided with the dial 165 on which are placed a series of numbers corresponding to or indicating the gears of the cone of gears that are carried on the shaft 140. The dial 165 is provided with a series of holes on the back thereof corresponding to these numbers on the front of the dial and a pin is placed on the plate 103 which engages with these holes as the dial is pushed against the plate. To hold the dial 165 normally against the plate 103 a spring 166 is provided which bears against the plate 103 on one side and against the gear 163 on the other side. To make room for the spring the bracket 160 is recessed between the gear and the plate. The rack 163ᴀ is guided in its up and down movement by the bracket 160.

The rack 163ᴀ is attached to a bracket 167 which is U shaped, the arms of which engage the shaft 140 with a sliding engagement. Between the arms of the bracket 167 is carried the cone of gears 168 which gears move up and down on the shaft 140 as the dial 165 is turned. As above explained this cone of gears 168 is composed of nine gears of different diameters, the smallest gears being on the bottom and the largest gears being on the top. These gears are splined to the shaft 140 by which the drum 81 is driven. To secure the proper angular velocity of the drum 81, the dial 165 is turned so as to bring the number of the gear desired into line with the mark on the plate above the dial 165, at which point the dial is locked holding the selected gear on a level with the gear 129. So that the cone of gears can move up and down without interruption to any desired position it is always desirable and in many cases necessary to put the dial 135 on the zero or neutral position, in which position the gear 129 has been swung far enough to the left to clear the largest gear on the cone 168. The dial 165 is then turned to bring the desired gear of the cone 168 on the same level with the gear 129. The number of the selected gear will appear at the top of the dial 165. The dial 135 is then turned to bring the gear 129 into mesh with a selected gear of the cone 168, in which position the corresponding number on the dial 135 will register with the mark above the dial, thus if the dial 165 is turned to bring the number 1 into register with the mark on the plate 103 at the top of the dial, the dial 135 must thereafter be turned from 0 to bring the No. 1 into the same position. If thereafter these numbers are changed the dial 135 must be turned back to 0 and the dial 165 must be turned to bring its desired number to the top after which the dial 135 will be turned to bring the same number to the top. Both dials will lock themselves in this position and will hold the gearing in the desired relation.

The dial 135 bears the letter R which stands for "reverse" or "rewind" and by turning the dial to bring the letter R to the top the gear 129 is moved still further away from the shaft 140 and into mesh with the gear 169 shown in dotted lines in Fig. 13 and full lines in Fig. 7. This gear 169 is carried between the plates 101 and 102 and is mounted on a shaft the ends of which have a bearing in these two plates. On the same shaft is mounted the large gear 171. These two gears are rigidly fastened together so that they turn with the same angular velocity. The gear 171 is considerably larger than the gear 169. The gear 171 meshes with a pinion 172 on the shaft 173 that carries the spool or supply roll of film that is inserted in the camera, the end of it being shaped to positively engage the spool and turn it. As the drum 81 turns to draw the film forward the spool 80 and the shaft 173 will turn idly and will turn the gears 172, 171 and 169 idly as well. When however the dial 135 is set on R the gear 129 positively drives the gears 169, 171 and 172 and causes the spool 80 to turn in the reverse direction and draw the film back from the drum 81 and wind it up again on the spool which carried it when it was inserted in the camera. During the rewinding operation the drum 81 and the shaft 140 and the cone of gears 168 will turn idly in the reverse direction and when the drum 81 is turned forward the spool 80, shaft 173, gears 172, 171 and 169 will turn forward idly it being understood that the gear 129 is out of mesh with the train of gearing on one side when it is in mesh with the train of gearing on the other side. To keep the drum 81 from turning too fast a spring retard 81ᴀ is provided bearing on the end thereof.

On the bottom of the shaft 140 is carried a disc 175 the outer edge of which projects through the plate 103 so that it can be seen while it is turning. The periphery of this disc is a dial marked with a series of numerals that indicate the inches of film that have been wound on the drum 81. This disc carries a lug 176 which at the end of each revolution engages with the tooth on the disc 177 mounted at right angles thereto and turns it $\frac{1}{10}$ of a revolution. The disc 177 is provided with ten teeth for this purpose. It is mounted to turn on the plate 103. The plate 103 is provided with a sight opening 178 through which the disc 175 can be seen. A spring 177ᴀ is provided that engages the edge of the disc 177 and keeps it from turning except as it is driven by the disc 175. The disc 175 is provided with a series of numerals from 0 to 9 which are displayed through the side opening 178 by means of which the revolutions of the drum are counted and a fair indication is given of the length of the film that has been exposed, it being understood that the indications of the discs 175 and 177 will be read together as the units and tens wheels of a decimal counter. A knob 179 is provided by which the disc 177 can be turned back to 0.

It will be understood that the film spool which is used in the camera will contain many feet of film, enough for a series of exposures. The counter that has just been described will inform the photographer and show him how rapidly the film is being used and how much of the film has been used at the end of each exposure. It is also desirable to mark the film at the end of each exposure so that the film can be cut on a line between the exposures. Each section of the film can then be developed separately. This is a great convenience in the handling of the film. For this purpose I provide a punch 185 which is mounted on a plate 186 which plate is mounted to slide in a slot in the upright plate of the flanged plate 103. The plate 186 slides under the flange 103A of the plate 103 and by the flange is held against tilting. The upright 132 limits the rearward movement of the plate 186. The plate 186 and punch 185 are normally held back against the plate 132 by means of a spring 187. At the end of an exposure the operator takes hold of the plate 186 at the hole provided in the forward part thereof and pulls it forward. This pulls the punch forward into contact with the film and presses it against the retard plate 82 perforating or indenting the film and showing plainly the end of the exposure.

When the camera has been focused and otherwise set ready for exposure it is necessary to set the mechanism in operation to take the picture which includes both the feeding of the film and the swinging of the camera through the desired arc of the circle. It will be assumed that the adjustments have been made with the dials 135 and 165 to secure the feeding of the film at the proper speed and that the spring motor of the camera has been wound up by the key 109. The camera is started and stopped by means of the key 190 through mechanism that will now be described.

Figure 19:
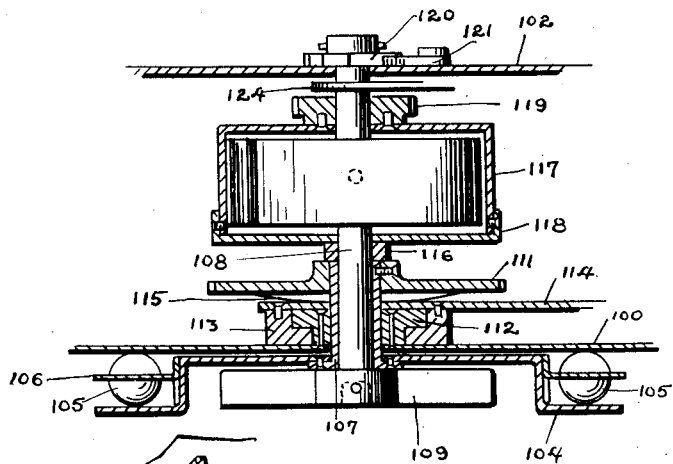
Fig. 19 is a vertical section through the spring motor and its shaft and parts associated therewith.
Figure 21:
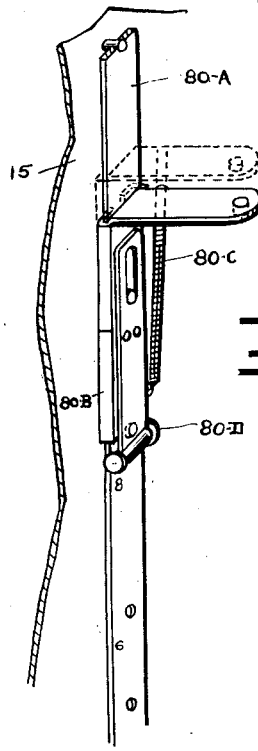
Fig. 21 is a perspective view of the bracket for holding the spool of film.

This key is mounted to turn in the plate 103 and has a dial thereon outside of the plate. The plate bears marks showing the 0 position, ½ position and the "on" position. The key extends through the plate 103 and through the upright plate 191 in which it has a bearing. Mounted to slide on the upright 191 is a plate 192 having an arm 193 thereon. The plate 192 has a slot 192A therein that slides on a tongue or guide 194 fastened on the plate 191 by which it is held to a straight up and down motion. A disc 195 is mounted on the shaft of the key 190. A lost motion of about 45 degrees is provided between the shaft and the key disc. For this purpose the disc is provided with a segmental or wedge shaped opening 196 in which swings a pin 197 on the shaft. The disc 195 is provided with a pin 198 that engages with a horizontal slot 199 in the plate 192, so that as the disc turns with the key the plate 192 moves down as the mechanism is thrown into operation and moves up when the mechanism is thrown out of operation. A spring 195A is provided on the shaft of the key to hold the disc 195 and plate 192 in place. The arm 193 engages between the collar 200 and gear 130 both of which are carried on a sleeve 201 which is adapted to slide up and down on the shaft 128 to which it is splined. The gear 130 and the sleeve 201 and the collar 200 are normally pressed down by a spring 202 which is placed between the collar 200 and the hub of the wheel 129. As the arm 193 moves down the spring pushes the sleeve 201 and gear 130 down into a line horizontal with the gear 111. The gear 111 is rigid with the tripod as appears from Fig. 19 and is held against turning, and as the gear 130 revolves it causes the camera to swing around the shaft 108. As above pointed out the gear 130 is splined to the shaft that carried the gear 129 so that it begins to turn just as soon as the spring motor begins to operate. Usually the teeth of the gear 130 will rest on top of the teeth of the gear 111 and will not drive the gear 111 on that account, but as soon as the gear 130 is turned far enough so that its teeth will mesh with the teeth of the gear 111 the spring 202 will force the gear 130 down into mesh so as to positively engage with the gear 111 and cause the gear 130 to swing the camera.

The disc 195 has a segment cut from one side forming a cam 203 thereon which engages with a lever 204 pivoted at 205. This lever has a link 206 connected to the top thereof which link has a rack 207 on the end thereof that engages with a pinion 208 contained in the housing 209. This housing has a bearing 210 in which the hub 211 of the pinion is mounted to turn. The hub is slotted and engages the swinging mirror 19 by which the mirror is swung from the full line position to the dotted line position shown in Fig. 5. This movement of the mirror uncovers the slot C and starts the exposure but does not occur until the key has been turned beyond the ½ mark at which point the key has released the motor. The key should then be turned quickly through the whole of the distance from the 0 point to the point marked "on". The key 190 is turned the full distance to start the camera for taking a picture but is only turned to ½ when the black paper is to be wound on the drum or to rewind the film and black paper on the spool. During this much of the operation it is necessary to keep the slot closed by the mirror 19 to keep out the light and prevent fogging of the picture. A spring 206^A is provided attached to the plate 102 at one end and to the link 206 at the other end. When the key is turned to "on" the spring is stretched and when the key is turned to 0 the spring contracts and draws the link 206 back causing the mirror to swing to cover the slot through which the exposure is made.

On the forward side of the plate 191 a crank 212 is provided keyed to the shaft of the key, from which crank a link 213 is hung which travels down as the key is turned in one direction and moves up when the key is turned in the opposite direction. A diamond shaped lug 214 is provided on the plate 191 and a pin 215 is provided on the link 213. A spring 216 throws the link forward when it is up so that the pin 215 engages on the forward side of the lug and is carried forward by it as it moves down. The link presses against the upturned end 217 of a lever 218 pivoted at 219. On the rear end of the lever is carried a shoe 220 preferably of fibre that normally engages with a drum or hub 221 due to the tension of the spring 221^A. This drum is fastened to the lower edge of the fan 222 which is carried on a shaft 223. This shaft is cone shaped at the bottom and rotates in a cone shape recess in a steel plate provided therefor on the plate 100. This shaft has a similar cone shaped bearing at the top carried by the plate 102. Near the top this shaft is provided with a pinion 224 it being understood that the drum 221, fan 222 and pinion 224 all turn with the shaft. The pinion 224 drives the fan from the gear 119 by a train of mechanism that is shown in Fig. 8 and will now be described. An idler 225 meshes with the gear 119 and this drives the small pinion 226 which in turn drives the large gear 227 keyed thereto. This in turn drives a small pinion 228 which in turn drives the large gear 229 keyed thereto. This in turn drives the pinion 230 which in turn drives the large gear 231 keyed thereto. This drives a pinion 232 which in turn drives the large gear 233 keyed thereto. The gear 233 meshes with the pinion 224 which drives the fan. This fan rotates at a relatively high angular velocity and because it encounters the resistance of the air it acts as a governor which regulates the speed with which the motor unwinds and drives the camera and its mechanism, and prevents it from driving them too fast and secures the driving of the parts at a uniform speed. The camera is always turned through the arc of the circle with a uniform angular velocity under all conditions and the length of its swing is determined manually by the operator who turns the key 190 down to start the swinging of the camera and stop it at the desired point by turning the key up.

The feeding of the film is secured by the adjustment of the dials 135 and 165 in advance of the operation of the key 190 it being understood that there is no cap on the lens nor any shutter in the lens to be opened to secure the exposure. The exposure is secured by the swinging of the mirror 19 through the key 190, lever 204, link 206 and the pinion 208 with its hub 211. It will also be understood that a cap may be used on the lens and a shutter may be used in the lens but if they are used the cap must be removed and the shutter must be opened before the key 190 is turned to secure the correct result.

It will also be understood that the light will vary due to variations in the strength of the daylight or the artificial illumination and it will also vary according to the value of the lens used which may be a doublet or a single lens with either a long or a short focus and these variations in the illumination must all be corrected by the use of the diaphragm in the lens mount so that the illumination will be practically uniform for the same speed of feed of the film. With the same strength of daylight if the speed of the film is increased, the opening of the diaphragm must be increased to correspond.

It will also be understood that the further out that the bellows is drawn for the same lens or different lens the faster the film should feed on the exposure. With the doublet lens the bellows will be drawn out the least and with that setting the large gears of the cone indicated by the numerals 1, 2 and 3 on the dial 165 must be used. These large gears will feed the film slowly. With the single lens having the intermediate focus the gears indicated by the numerals 4, 5 and 6 must be used and with the single lens having the long focus the small gears indicated by the numerals 7, 8 and 9 must be used. These small gears will feed the film fastest. The particular gear that must be used is indicated by the dial 52 on the side of the camera as shown in Fig. 1 and the function of that dial for the purpose of selecting the gear will now be explained.

The operator sets up the camera and focuses it in the ordinary way by turning the dial 52 to rack the lens front in or out to the correct position. If he is using the long focus lens indicated on the dial by 24 he will focus the camera and will observe the position of the number 24 pointer with reference to the numbers 7, 8 and 9 on the flange 55. The number 24 and its pointer is finished in black and the numbers 7, 8 and 9 on the flange are also finished in black.

If the number 24 is nearer to the 7 than to the 8 this indicates that he must use the gear No. 7 for the purpose of feeding the film. If the pointer is nearer No. 8 than it is to No. 7 or No. 9, then he must use the 8th gear in feeding the film, and if the pointer is nearest to No. 9 then he must use the 9th gear (which is the smallest gear) for feeding the film and he should set the dial 165 accordingly.

If he is using the 18 inch focus lens then he should focus the camera on the object and observe the position of the pointer 18 with reference to the figures 4, 5 and 6 on the flange. He will observe that the figures 18 and 4, 5 and 6 are in red and he will also observe that the figures 10 on the dial and the figures 1, 2 and 3 on the flange are in green so that in this way by the color used the figures on the dial are associated with the figures on the flange that indicate the gears that must be used to secure the correct feeding of the film. If the pointer 18 is nearest the figure No. 6 he must use the 6th gear and if it is nearest to the figure 5 he must use the 5th gear and if it is nearest the fig. 4 he must use the 4th gear.

If he is using the doublet lens he will focus the camera and will observe the position of the pointer 10 with reference to the figures 1, 2 and 3. If the pointer is nearest the fig. 1, he must use the gear 1 which is the largest of the series. If the pointer is nearest the fig. 2 he must use the gear 2 which is the second largest of the series and if the pointer is nearest the fig. 3 he must use the gear 3 which is the third largest of the series, and he must set the dial 165 accordingly.

In each case the dial 135 must be set at 0 before shifting the gears with the dial 165 and after the gear has been selected by the dial 165 the dial 135 must be turned to the correct position to secure the driving of the gear selected by the dial 165. When the dials 135 and 165 are set correctly, they will both show the same number at the top of the dial.

Figure 16:
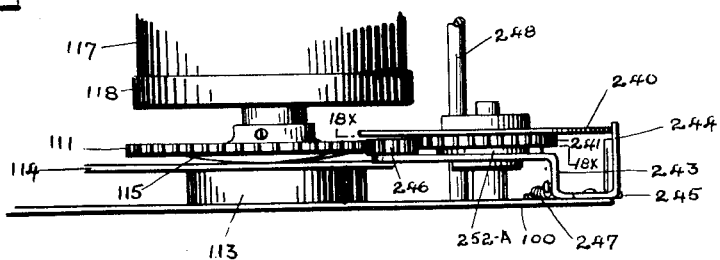
Fig. 16 is a side elevation of the parts shown in Fig. 15.
Figure 17:
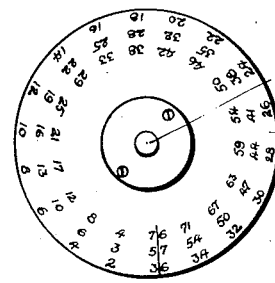
Fig. 17 is a plan view of the dial used for estimating the length of film needed for an exposure.
Figure 18:
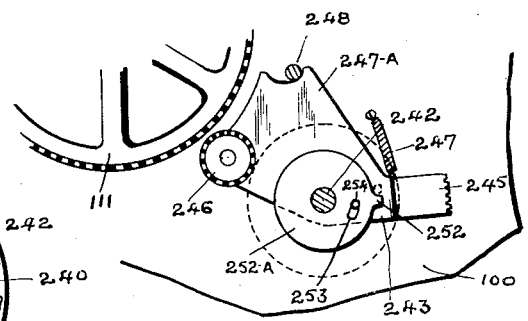
Fig. 18 is a horizontal section on the line 18×—18× of Fig. 16.
Figure 20:
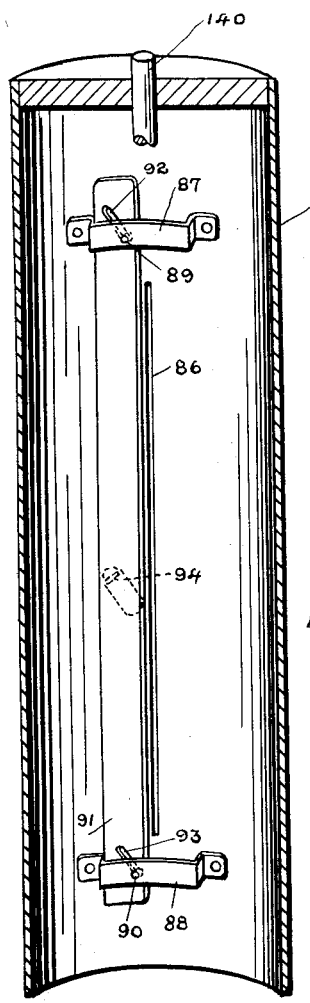
Fig. 20 is a vertical section through the winding drum.

In Figures 15, 16, and 17 I have shown a dial 240 which can be used for the purpose of estimating the amount of film that will be needed for any given exposure. On this dial are 3 concentric rings of figures. The figures of the outer ring are written in green and have the lowest value and the figures of the inner row are written in black and have the highest value and the figures of the intermediate row are written in red and have a value between the green and the black figures. The colors of the rings of figures correspond to the length of the focus of the lens that is to be used as is indicated on the dial 52 in Figure 1. The outer ring of figures is to be read in connection with the use of the short focus lens or the lens having a 10″ focus and the inner ring of figures is to be read in connection with the long focus lens or the lens havng the 24″ focus and the intermediate ring of figures is to be used in connection with the lens having the 18″ focus. Each ring has the same number of numbers thereon arranged from right to left in regular order, the corresponding number in each series being arranged in radial lines.

Underneath the dial 240 and fastened thereto, is a gear 241 concentric therewith. Both the dial 240 and gear 241 are mounted to rotate together freely on the stud 242 which is rigidly fastened on the plate 100. A bracket 243 is provided which is pivotedly mounted on the stud 242 so that it can swing thereon. A stationary bracket 244 is provided below the dial which carries a zero mark thereon which serves to mark the starting point of the pointer on the dial 240. A bracket 244$^A$ is provided above the dial which has a similar mark thereon above the dial. The bracket 244$^A$ has a recess therein deep enough to display any three figures that focus in the same radial line. The bracket 243 has a handle 245 thereon which projects out beyond the bracket 244 so as to be accessible for the purpose of swinging the bracket 243. The bracket 243 carries an idler 246 which is always in mesh with the gear 241 and is normally out of mesh with the gear 111 being held normally in that position by the spring 247 which is attached to the plate 100 at one end and to the bracket 243 at the other end. The bracket 243 can be moved from the full line to the dotted line position shown in Fig. 15 for the purpose of bringing the pinion 246 into mesh with the gear wheel 111. The bracket 243 has an arm 247$^A$ thereon which engages with the stud 248 by a forked end which permits it to have a small movement relative thereto sufficient to bring the pinion 246 into mesh with the gear 111. In this way the movement of the bracket 242 is limited to a movement that is sufficient to secure the desired movement in bringing the train of gears into mesh. When the gears are in mesh the pointer on the dial will stand in line with the zero mark on the bracket 244 and 244$^A$. With the gears in mesh the camera can now be turned by hand through the same arc over which it is intended to swing in taking the desired picture, and the dial will turn to expose the numbers in the recess of the bracket 244$^A$ to indicate approximately the length of the film that will be needed to take a picture over the angle selected. It will be understood that the 3 numbers on the dial 240 that are radially in line with each other will appear in the recess of the bracket 244$^A$ and that all other numbers will be covered up. During this trial operation the key 190 is not disturbed and the film is not advanced on the drum. Thereafter the camera will be brought back to the starting point and the dial 240 will be left idle and the camera will then be started with the key 190 to make the desired exposure at the end of which the amount of film which has been used in the exposure can be read off in inches on the dials 175 and 177. I have found it desirable from a practical standpoint to use a standard 3" tube for the drum 81 so that when it begins to wind the film it will wind less than 10" of film but in a few revolutions it will wind 10" of film and thereafter will wind more than 10".

A spiral spring 250 is provided one end of which is fastened to the dial 240 and the other end of which is fastened to the stud 242 so that when the dial is turned the spring is put under tension and when it is released the dial is drawn back to its starting point. To limit the forward and back movement of the dial 240, a pin 251 is provided on the under side of the gear 241 and this engages with a lug 252 which projects radially from the disc 252$^A$ which is placed below the gear 241. This disc 252$^A$ has a short slot 253 therein concentric with the centre thereof. A pin 254 is carried on the bracket 243 and engages this slot to limit oscillation of the disc. This gives to the disc a lost motion of a few degrees and this in turn permits the dial to turn a little more than one complete revolution instead of less than one revolution to which it would be limited if the disc 252$^A$ were held rigidly in place.

As will be seen from an inspection of Figs. 1 and 7 the operating mechanism of the camera is carried on the plate 100 which is fastened to the camera body by means of the spring clips 260 shown in Fig. 1, three of which are provided on each of two sides of the camera. The drum 81 is supported from the plate 100 and separates from the camera body when the plate 100 is removed therefrom. By this arrangement the mechanism is easily assembled and is then easily inserted in the camera.

On top of the camera box is placed a handle 261 by which it is easily carried.

I claim:

1. A camera having a box, a compartment partitioned off at one rear corner of the box, a compartment partitioned off at another rear corner of the box with a narrow opening between them through which the light can pass from the lens to the film, a mirror mounted to cover said opening and being mounted at an angle to reflect the image from the lens to a vertical opening in one of the vertical sides of the camera.

2. A camera having a box, a compartment partitioned off at one rear corner of the box, a compartment partitioned off at another rear corner of the box with a narrow opening between them through which the light can pass from the lens to the film, a mirror mounted to cover said opening and being mounted at an angle to reflect the image from the lens to a vertical opening in one of the vertical sides of the camera, said mirror being mounted to swing to one side and uncover said opening.

3. A camera having a box, a compartment partitioned off at one rear corner of the box, a compartment partitioned off at another rear corner of the box with a narrow opening between them through which the light can pass from the lens to the film, a mirror mounted to cover said opening and being mounted at an angle to reflect the image from the lens to a vertical opening in one of the vertical sides of the camera, a ground glass plate mounted in the side of said camera to receive the image reflected by said mirror.

4. A camera having a box, a compartment partitioned off at one rear corner of the box, a compartment partitioned off at another rear corner of the box with a narrow opening between them through which the light can pass from the lens to the film, a mirror mounted to cover said opening and being mounted at an angle to reflect the image from the lens to a vertical opening in one of the vertical sides of the camera, a ground glass plate mounted in the side of said camera to receive the image reflected by said mirror, a door covering said ground glass plate, said door being hinged to swing to expose the ground glass plate.

5. A camera having a box, a compartment partitioned off at one corner of the box, a compartment partitioned off at another corner of the box with a narrow opening between them through which the light can pass from the lens to the film, a mirror mounted to cover said opening being mounted to swing on one edge thereof and being mounted at an angle to reflect the image from the lens to one side of the camera, a ground glass plate mounted in the side of said camera to receive the image reflected by said mirror, a door covering said ground glass plate, said door being hinged to swing to expose the ground glass plate, a pocket mounted to swing on the same hinge said pocket supporting said ground glass and being adapted to swing to uncover an opening in the side of the camera.

6. A camera having a box, a compartment partitioned off at one corner of the box, a compartment partitioned off at another corner of the box with a narrow opening between them through which the light can pass from the lens to the film, a mirror mounted to cover said opening being mounted to swing on one edge thereof and being mounted at an angle to reflect the image from the lens to one side of the camera, a ground glass plate mounted in the side of said camera to receive the image reflected by said mirror, a door covering said ground glass plate, said door being hinged to swing to expose the ground glass plate, a pocket mounted to swing on the same hinge, said pocket supporting said ground glass and being adapted to swing to uncover an opening in the side of the camera, said door and said pocket being adapted to be fastened together to swing together, a latch for holding either the door or the door and pocket in open position.

7. A camera having a box containing the camera elements and a spring motor and gearing for turning the camera and feeding the film, a turn table below the camera and motor adapted to rest on a plane surface and support the camera and motor while at rest and while it is turning, said motor being located in the camera concentric with the center of the turn table.

8. A camera having a box containing the camera elements and a spring motor and gearing for turning the camera and feeding the film, a turntable below the camera and motor adapted to rest on a plane surface and support the camera and motor while at rest and while it is turning, said camera being balanced on said turntable with the lens front in any position, said motor being located in the camera concentric with the center of the turn table.

9. A camera having a box containing the camera elements and a motor and gearing for turning the camera and feeding the film, a turn table below the camera adapted to rest on a plane surface and support the camera while at rest and while it is turning, said turn table comprising the base of the camera and a plate having an annular flange thereon, a series of balls between the flange and the plate, said motor being located in the camera concentric with the center of the turn table.

10. A camera having a box containing the camera elements and a motor and gearing for turning the camera and feeding the film, a turn table below the camera adapated to rest on a plane surface and support the camera while at rest and while it is turning, said turn table comprising the base of the camera and a plate having an annular flange thereon, a series of balls between the flange and the plate, a winding key mounted on the plate and centered therein with reference to the flange.

11. A camera having a box containing the camera elements and a motor and gearing for turning the camera and feeding the film, a turn table below the camera adapted to rest on a plane surface and support the camera while at rest and while it is turning, said turn table comprising the base of the camera and a plate having an annular flange thereon, a series of balls between the flange and the plate, an annular plate having openings therein engaging said balls to hold them in place on the flange, said plate having lugs in the inner edge thereof extending up and down therefrom by which said plate is held in position above the flange.

12. A camera having a box containing the camera elements and a motor and gearing for turning the camera and feeding the film, a turn table below the camera, a winding key having its handle nested centrally in the base of the turn table, a shaft extending up from said handle through the turn table to the center of the motor.

13. A camera having a box containing the camera elements and a motor and gearing for turning the camera and feeding the film, a turn table below the camera, a winding key having its handle nested in the base of the turn table, a shaft extending up from said handle through the turn table to the center of the motor, said turn table comprising the base of the camera and a plate having an annular flange thereon, a series of balls between the flange and the plate, a sleeve surrounding said shaft and fastened at its lower end to said plate.

14. A camera having a box containing the camera elements and a motor and gearing for turning the camera and feeding the film, a turn table below the camera, a winding key having its handle nested in the base of the turn table, a shaft extending up from said handle through the turn table to the center of the motor, said turn table comprising the base of the camera and a plate having an annular flange thereon, a series of balls between the flange and the plate, a sleeve surrounding said shaft and fastened at its lower end to said plate, a flanged collar having a flange at the top thereof, said collar being fastened to the base of the camera and being arranged concentric with said sleeve to turn thereon.

15. A camera having a box containing the camera elements and a motor and gearing for turning the camera and feeding the film, a turn table below the camera, a winding key having its handle nested in the base of the turn table, a shaft extending up from said handle through the turn table to the center of the motor, said turn table comprising the base of the camera and a plate having an annular flange thereon, a series of balls between the flange and the plate, a sleeve surrounding said shaft and fastened at its lower end to said plate, a gear fastened to the top of said sleeve around which the camera is driven while the gear and flanged plate remain stationary, means for driving the camera around said gear.

16. A camera having a box containing the camera elements and a motor and gearing for turning the camera and feeding the film, a turn table below the camera, a winding key having its handle nested in the base of the turn table, a shaft extending up from said handle through the turn table to the center of the motor, said turn table comprising the base of the camera and a plate having an annular flange thereon, a series of balls between the flange and the plate, a sleeve surrounding said shaft and fastened at its lower end to said plate, a gear fastened to the top of said sleeve around which the camera is driven while the gear and flanged plate remain stationary, a pinion on the motor case driven by said motor, a gear driven by said pinion, a shaft for said shaft and gear, said gear being carried on a frame that is mounted to swing concentric with said pinion and said first named gear.

17. In a camera, the combination of a spring motor having a fixed central axis, a pinion, concentric with said fixed axis, turned by said motor, a stationary gear concentric with said fixed axis, a gear driven by said pinion, a pinion driven by said gear and concentric therewith, said gear and pinion having a swinging axis, said pinion being adapted to engage with said stationary gear and travel around it as it is driven and carry with it the gear that is concentric therewith.

18. In a camera, the combination of a drum for winding film, a shaft with a fixed axis for turning said drum, a cone of gears splined on said shaft and adapted to be raised and lowered thereon, a spring motor having a pinion thereon with a fixed axis, a gear meshing with the pinion and mounted to swing around it, into and out of engagement with any gear selected on said cone of gears by which the shaft and drum are driven at different angular velocities from the pinion on the motor.

19. A camera having a box containing the camera elements and a motor and gearing for turning the camera and feeding the film, a turn table below the camera, a winding key having its handle nested in the base of the turn table, a shaft extending up from said handle through the turn table to the center of the motor, said handle having a threaded opening therein by which it is adapted to be fastened to a tripod.

20. In a camera, the combination of a spring motor, a pinion driven thereby, a train of multiplying gears driven thereby, a fan governor driven thereby, a hub on said governor, a friction brake adapted to bear on said hub by which said governor and its motor is stopped or released for rotation, a lever pivoted in the middle, said brake being carried on one end of said lever, a cam on the other end of said lever by which it is moved.

21. In a camera, the combination of a spring motor, a pinion driven thereby, a train of multiplying gears driven thereby, a fan governor driven thereby, a hub on said governor, a friction brake adapted to bear on said hub by which said governor and its motor is stopped or released for rotation, a lever pivoted in the middle, said brake being carried on one end of said lever, a cam on the other end of said lever, a slide moving up and down along said cam to swing the lever.

22. In a camera, the combination of a spring motor, a pinion driven thereby, a train of multiplying gears driven thereby, a fan governor driven thereby, a hub on said governor, a friction brake adapted to bear on said hub by which said governor and its motor is stopped or released for rotation, a spring for holding said brake against the hub, a key for moving said brake away from the hub, a screen for protecting the film from exposure, said screen being moved to one side by the movement of the key to start the motor.

23. In a camera, the combination of a drum for winding film, a shaft with a fixed axis for turning said drum, a cone of gears splined on said shaft and adapted to be raised and lowered thereon, a spring motor for driving said cone of gears and means for selectively applying the power of said motor to any one gear of said cone of gears to change the angular velocity of said drum.

24. In a camera, the combination of a spring motor having a fixed central axis, a pinion, concentric with said fixed axis, turned by said motor, a frame mounted to swing around the axis of said spring motor, a shaft and gear carried thereon, said gear being constantly in mesh with said pinion.

25. In a camera, the combination of a spring motor having a fixed central axis, a pinion, concentric with said fixed axis, turned by said motor, a frame mounted to swing around the axis of said spring motor, a shaft and gear carried thereon, said gear being constantly in mesh with said pinion, a shaft, a cone of gears splined thereon and adapted to move along the shaft, said gear being adapted to swing into mesh with any gear of the cone of gears or the same elevation therewith.

26. In a camera, the combination of a spring motor, a pinion driven thereby, a train of multiplying gears driven thereby, a fan governor driven thereby, a hub on said governor, a friction brake adapted to bear on said hub by which said governor and its motor is stopped or released for rotation, a spring for holding said brake against the hub, a key for moving said brake away from the hub, a frame having a shaft thereon, a sleeve and pinion splined on the shaft carried on said frame, a fixed gear concentric with the motor axis, said pinion and sleeve being movable sideways to engage with the fixed pinion.

27. In a camera, the combination of a main frame, a spring motor mounted thereon with a fixed central axis, a pinion, concentric with said fixed axis, turned by said motor, a frame mounted to swing around the axis of said spring motor, means for locking it in a series of positions with reference to the main frame.

28. In a camera, the combination of a main frame, a spring motor mounted thereon with a fixed central axis, a pinion, concentric with said fixed axis, turned by said motor, a frame mounted to swing around the axis of said spring motor, means for locking it in a series of positions with reference to the main frame, a shaft and gear carried on said frame, said gear being constantly in mesh with said pinion and being driven thereby.

29. In a camera, the combination of a main frame, a spring motor mounted thereon with a fixed central axis, a pinion, concentric with said fixed axis, turned by said motor, a frame mounted to swing around the axis of said spring motor, means for locking it in a series of positions with reference to the main frame, a shaft and gear carried on said frame, said gear being constantly in mesh with said pinion and being driven thereby, a sleeve and pinion splined on said shaft carried on said frame, a fixed gear concentric with the motor axis, by which said pinion on the frame is rotated and caused to wander around the fixed gear and turn the camera on the axis of the motor in so doing.

30. In a camera, the combination of a plate, a shaft extending through the plate, a pinion on said shaft, a rack engaging with said pinion, a shaft, a cone of gears thereon, connections between said rack and said cone of gears whereby the cone of gears is raised and lowered by the movement of the rack upon the turning of the shaft and pinion.

31. In a camera, the combination of a plate, a shaft extending through the plate, a pinion on said shaft, a rack engaging with said pinion, a shaft, a cone of gears thereon, connections between said rack and said cone of gears whereby the cone of gears is raised and lowered by the movement of the rack upon the turning of the shaft and pinion, means for locking said cone of gears in any one of a series of positions.

32. In a camera, the combination of a plate, a shaft extending through the plate, a pinion on said shaft, a rack engaging with said pinion, a shaft, a cone of gears thereon, connections between said rack and said cone of gears whereby the cone of gears is raised and lowered by the movement of the rack upon the turning of the shaft and pinion, means for locking said cone of gears in any one of a series of positions, means for swinging a driving gear into mesh with the selected gear of said cone of gears and locking it in said position, means for driving said driving gear.

33. In a camera, a winding drum, a variable speed driving gear therefor, a swinging frame, a gear mounted thereon adapted to swing into and out of driving engagement therewith, a rack on said frame concentric with the center on which the frame swings, a shaft having a pinion thereon engaging with said rack by which on the turning of the shaft the position of the frame and its gear is adjusted.

34. In a camera, the combination of a key and shaft, a plate mounted to turn with said shaft, a plate mounted to slide up and down, connections between said sliding plate and the plate on the key whereby the sliding plate is moved up and down on the turning of the key.

35. In a camera, the combination of a key and shaft, a plate mounted to turn with said shaft, a plate mounted to slide up and down, connections between said sliding plate and the plate on the key whereby the sliding plate is moved up and down on the turning of the key, an arm on said plate, a shaft, having a sleeve with a collar and pinion on the ends thereof, said arm engaging said sleeve between the collar and pinion and being adapted to lift the pinion.

36. In a camera, the combination of a key and shaft, a cam plate mounted to turn with said shaft, a lever bearing against said cam plate, a rack connected to the end of said lever whereby the lever is rocked and the rack is moved on the turning of the key and cam plate.

37. In a camera, the combination of a key and shaft, a cam plate mounted to turn with said shaft, a lever bearing against said cam plate, a rack connected to the end of said lever whereby the lever is rocked and the rack is moved on the turning of the key and cam plate, a pinion engaged by said rack, a screen keyed to said pinion and adapted to turn therewith on the movement of the cam plate.

38. In a camera, the combination of a key and shaft, a cam plate mounted to turn with said shaft, a lever bearing against said cam plate, a rack connected to the end of said lever whereby the lever is rocked and the rack is moved on the turning of the key and cam plate, a lost motion between the shaft and the cam plate whereby the movement of the rack is delayed.

39. In a camera, the combination of a key and shaft, a cam plate mounted to turn with said shaft, a lever bearing against said cam plate, a rack connected to the end of said lever whereby the lever is rocked and the rack is moved on the turning of the key and cam plate, a lost motion between the shaft and the cam plate whereby the movement of the rack is delayed, a pinion engaged by said rack, a screen keyed to said pinion and adapted to turn therewith on the movement of the cam plate.

40. In a camera, the combination of a key, a motor and screen controlled thereby, means including a lost motion connection between the key and the screen whereby on the turning of the key, the motor is first released, and thereafter the screen is turned by the key.

41. In a camera, the combination of a key, a motor and screen controlled thereby, means including a lost motion connection between the key and the screen whereby on the turning of the key, the motor is first released, and thereafter the screen is turned by the key, gearing to turn the camera, said gearing being normally held out of engagement and being released to move into engagement on the movement of the screen.

42. A camera having a box containing the camera elements, a spool for holding the film, a drum on to which the film is to be wound, a spring motor and gearing for turning the camera and feeding the film to the drum during exposure, means for rewinding the film on the spool, means for shifting the gearing into connection therewith to cause the motor to wind the film back on the spool.

43. A camera having a box containing the camera elements, a spool for holding the film, a drum on to which the film is to be wound, a spring motor and gearing for turning the camera and feeding the film to the drum during exposure, means for rewinding the film on the spool, means for shifting the gearing into connection therewith to cause the motor to wind the film back on the spool, without moving the camera.

44. A camera having a box containing the camera elements, a spool for holding the film, a drum on to which the film is to be wound, a spring motor and gearing for turning the camera and feeding the film to the drum during exposure, means for rewinding the film on the spool, means for shifting the gearing into connection therewith to cause the motor to wind the film back on the spool, means to retard the turning of the drum on the rewinding of the film.

45. A circuit camera having a box, a compartment partitioned off at one rear corner of the box, a compartment partitioned off at another rear corner of the box with a narrow vertical opening between them through which light can pass from the lens to the film, a mirror pivotally mounted to cover said opening and exclude the light therefrom and being mounted at an angle to reflect the image from the lens to one of the vertical sides of the camera, said mirror being mounted to swing on an axis parallel to the length of the narrow opening to uncover said opening and the film and cover the opening to protect the film.

46. A circuit camera having a box, a small compartment partitioned off at one rear corner of the box, a large compartment partitioned off at another rear corner of the box with a narrow opening between them through which the light can pass from the lens to the film, a mirror pivotally mounted to cover said opening so as to exclude the light from the film and being mounted at an angle to reflect the image from the lens to an opening in one side of the camera box.

47. A circuit camera having a box, a small compartment partitioned off at one corner of the box, a large compartment partitioned off at another corner of the box with a narrow opening between them through which the light can pass from the lens to the film, a mirror pivotally mounted to cover said opening so as to exclude the light from the film and being mounted at an angle to reflect the image from the lens to an opening in one side of the camera box, the back of said mirror making close contact with the compartments at the outer end of said narrow opening to shut out the light from the film exposed to said opening, a ground glass plate to which the image is reflected by the mirror, the combination being adapted to permit the focusing of the camera while the film is in place therein and causing the exposure of the film on the movement of the mirror.

48. In a circuit camera, the combination of a lens, a ground glass plate on which the camera can be focused while the film is in place ready for exposure, a mirror placed between the lens and ground glass plate, said mirror protecting the film while the camera is being focused, said mirror being movable thereafter to expose the film to take the picture, means for moving both the camera and film during the exposure of the film.

49. In a circuit camera, the combination of a lens, a ground glass plate on which the camera can be focused while the film is in place ready for exposure, a mirror placed between the lens and ground glass plate, said mirror protecting the film while the camera is being focused, said mirror being movable thereafter to expose the film to take the picture, means for moving both the camera and film during the exposure of the film, while the ground glass plate is in position in the camera ready for the next focusing of the camera.

50. A camera having a box containing the camera elements and a spring motor and gearing for turning the camera and feeding the film located in the camera, a turntable below the camera, adapted to rest on a plane surface and support the camera, a shaft extending up from the center of the turntable and through the center of the motor.

51. A camera, having a box containing the camera elements and a spring motor and gearing for turning the camera and feeding the film located in the camera, a turntable below the camera, adapted to rest on a plane surface and support the camera, a shaft extending up from the center of the turntable and through the center of the motor, said shaft being adapted to turn to wind the motor and otherwise remaining still while the motor is operating to turn the camera.

52. A camera having a box containing the camera elements and a spring motor and gearing for turning the camera and feeding the film located in the camera, a smooth plate on the bottom of the camera, a turntable below the camera and below the smooth plate, a ring of balls between the turntable and the plate and a shaft centrally connecting the turntable, the camera and the motor inside of the camera.

53. A camera having a box containing the camera elements and a spring motor and gearing for turning the camera and feeding the film located in the camera, a smooth plate on the bottom of the camera, a turntable below the camera and below the smooth plate, a ring of balls between the turntable and the plate, a plate located midway between the turntable and the bottom of the camera and having a series of openings therein for holding the balls suitably spaced apart.

54. A camera having a box containing the camera elements, a smooth plate on the bottom of the camera, a turntable below the smooth plate, a ring of balls between the turntable and the plate, a plate located midway between the turntable and the bottom of the camera and having a series of openings therein for holding the balls suitably spaced apart.

55. A camera having a box containing the camera elements, a smooth plate on the bottom of the camera, a turntable below the smooth plate, a ring of balls between the turntable and the plate, a plate located midway between the turntable and the bottom of the camera and having a series of openings therein for holding the balls suitably spaced apart, the inner edge of said plate being struck with lugs extending up and down by which the plate is held in mid position.

56. A camera having a box, a compartment partitioned at one corner of the box, a compartment partitioned off at another corner of the box, with a narrow opening between them through which the light can pass from the lens to the film, a wide mirror mounted to swing on one edge on an axis running parallel to the length of said opening and being pivoted to one side of said narrow opening and normally making close contact with said compartments to exclude the light from said opening, said mirror being adapted to normally cover said opening to exclude the light therefrom and to normally stand at an angle to reflect the image from the lens to one side of the camera and being adapted to swing to one side to permit the exposure of the film.

57. A camera having a box, a compartment partitioned off at one corner of the box, a compartment partitioned off at another corner of the box, with a narrow opening between them, through which the light can pass from the lens to the film, a wide mirror mounted to swing on one edge on an axis running parallel to the length of said opening and being pivoted to one side of said narrow opening and normally making close contact with said compartments to exclude the light from said opening, said mirror being adapted to swing to one side to uncover said opening thereby exposing said film.

58. A camera having a box, a large compartment partitioned off at one corner of the box, a small compartment partitioned off at another corner of the box, with a narrow opening between them through which the light can pass from the lens to the film, a wide mirror mounted to swing on one edge on an axis running parallel to the length of said opening and being pivoted to one side of said narrow opening and normally making close contact with said compartments to exclude the light from said opening, said mirror being adapted to swing to one side to uncover said opening to expose the film.

59. A camera having a box containing the camera elements and a spring motor and gearing for turning the camera and feeding the film located in the camera, a turntable below the camera, a shaft extending up from the center of the turntable and through the center of the motor.

In testimony whereof I affix my signature.

ARTHUR V. CASSAL.